SEMICONDUCTIVE DISPLAY DEVICE

Filed June 25, 1965

Inventor:
Simeon V. Galginaitis,
by John F. Ahern
His Attorney.

United States Patent Office 3,333,135

Patented July 25, 1967

3,333,135
SEMICONDUCTIVE DISPLAY DEVICE

Simeon V. Galginaitis, Schenectady, N.Y., assignor to General Electric Company, a corporation of New York Filed June 25, 1965, Ser. No. 466,919
13 Claims. (Cl. 313—108)

ABSTRACT OF THE DISCLOSURE

A light source for emitting light from a region which increases with increasing applied voltage including a semiconductive body with p and n regions and a junction wherein the band gap energy varies with the location within the junction according to a predetermined pattern.

The present invention relates to semiconductive junction devices for producing electromagnetic radiation in response to an applied voltage.

In indicating and display systems of modern design, it is frequently desirable to replace conventional scale and pointer systems with devices in which a change in the magnitude of a particular quantity produces a change in an optical display pattern. For example, it has been found useful in many cases to use devices in which the length of a rectangular bar indicates the magnitude of the quantity, either by continuous variation or by stepwise variation. In other situations, two dimenisonal pattern changes are of interest.

Accordingly, it is an object of the present invention to provide a display device wherein a radiation pattern varies in response to changes in the magnitude of a measured quantity.

A further object of the present invention is the provision of an indicating device wherein a visual display pattern indicates the magnitude of a measured quantity.

A particular object is the provision of a device wherein the size of a region of emitted radiation corresponds to the magnitude of a measured quantity.

Briefly, in accord with a preferred embodiment of the present invention I provide a monocrystalline body of semiconductive material including a radiation emissive junction wherein the value of the energy band gap of the semiconductive material has different values at different locations in the junction. The value of the energy band gap at any point within the junction determines the potential difference which must be applied to produce emission of electromagnetic radiation from that point. Accordingly, the magnitude of an applied potential difference is indicated by the regions of the junction which emit radiation in response thereto. In accord with a particular form of this invention, the junction may comprise a rectangular bar within which the value of the energy band gap varies progressively along the length of the bar. The magnitude of an applied voltage is indicated by the length of the junction from which radiation is emitted.

The novel features believed characteristic of the invention are set forth in the appended claims. The invention itself, together with further objects and advantages thereof may best be understood by reference to the following description taken in connection with the appended drawings in which:

Figures 1, 2, 3, 4, 5:
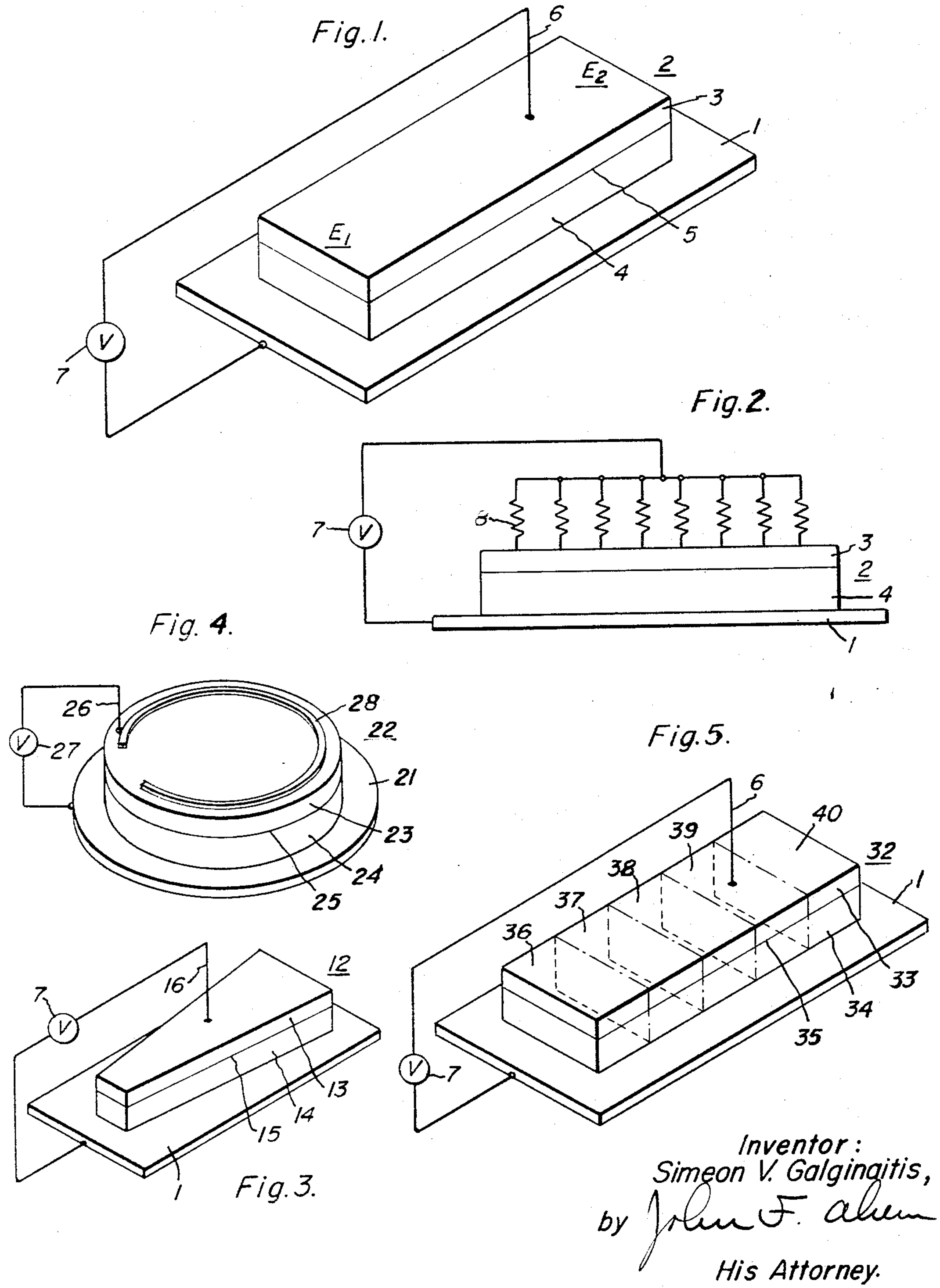
FIGURE 1 is a perspective view of one embodiment of the present invention.
FIGURE 2 is a vertical plan view of a device including an additional feature of the present invention.
FIGURES 3–5 are perspective views illustrating further embodiments of the present invention.

In FIGURE 1, an illustrative embodiment of my invention is shown which includes a metallic support plate 1 upon which is mounted a monocrystalline body 2 of semiconductive material. The support plate may be omitted and other electrical contact means provided if preferred. The body 2 includes two regions of opposing conductivity type, for example a p-type region 3 and an n-type region 4, and a p-n junction 5 therebetween. The illustrated orientation of the p and n regions may be reversed, depending on the materials used. Metallic plate 1 forms an electrical non-rectifying contact to region 4 and an electrode 6 is provided to establish non-rectifying electrical contact to region 3. A voltage source 7 is connected between support plate 1 and electrode 6 and is arranged in a circuit, not shown, so that its magnitude corresponds to the magnitude of a quantity to be indicated.

The emission of radiation by semiconductive junction devices arises from the energy released upon the recombination of positively and negatively charged particles within the junction. The recombination occurs when a voltage applied across the junction approaches a value corresponding to the band gap of the material. The band gap is the energy difference between the highest valence-electron energy states and the lowest conduction-electron energy states. The value of the energy band gap within the junction is determined by the atomic structure and the binding energy which binds the electrons to the various atoms. Since this depends on the composition of the material, the value of the band gap may be varied by appropriately changing the composition within the junction.

Such junctions in semiconductive materials can only emit radiation when the applied voltage approaches a value corresponding to that of the band gap. In accord with the present invention, therefore, the composition of the semiconductive material is controlled so that the value of the energy band gap at any point depends on the location of that point within the junction and this variation establishes the pattern of radiation to be produced with increasing applied voltage. Thus, in the device shown in FIGURE 1, the band gap of the material may vary continuously and, in a particular case, linearly along the length of the junction from a value $E_1$ at the left to a value $E_2$ at the right in FIGURE 1. Assuming that $E_2$ is greater than $E_1$ the entire diode is dark or non-radiating when the applied potential difference is less than $E_1$. As the applied voltage approaches and exceeds $E_1$, radiation is produced over that portion of the length of the device where the applied voltage approaches or exceeds the band gap. If the total length of the device is L and the lighted portion is of length $x$, the applied potential difference is given by the equation $$V=E_1+\frac{(E_2-E_1)x}{L}$$

In other words, for fixed $E_1$, $E_2$ and L, the length of the lighted portion is proportional to the applied potential difference. Therefore, the length of the lighted strip can be used to measure or indicate the magnitude of the applied voltage or, alternatively, either visible or invisible radiation may be used in combination with a suitable recording medium to record the magnitude of a voltage which varies with time. For example, if the applied voltage corresponds to an audio sound, the diode of FIGURE 1 might be used to illuminate a strip of photographic film passing thereunder to provide a sound track recording.

The body 2 of the present invention may comprise any semiconductive material embodying a radiation emissive junction wherein the value of the energy band gap is varied according to longitudinal position along the junction. Materials which are particularly suitable for this invention are those which comprise solid solutions of independent semiconductors having similar crystal structures so that monocrystalline body of varying composition can be prepared. Thus, since the value of the energy band gap varies with different materials and since the band gap of a solid solution of two materials depends on the proportions of the two materials, a desired pattern of radiation emission can be produced by correspondingly controlling the proportions of the two materials. Such materials include, for example, gallium arseno-phosphide, zinc seleno-telluride, and zinc-cadmium telluride. The chemical designation for such compounds takes the form $AB_{1-x}C$ or $A_xB_{1-x}C$ wherein $x$ may vary from 0 to 1.

In the case of gallium arseno-phosphide the material has the largest band gap when $x$ is 0 and the smallest band gap when $x$ is 1. A bar-shaped indicator may therefore be produced by preparing a crystal of gallium arseno-phosphide which varies progressively along one dimension from a composition relatively rich in phosphorus to a composition relatively rich in arsenic. The crystal may be made n-type by adding donor impurities such as tin, selenium, or tellurium at a concentration in the range of from $10^{17}$ to $10^{18}$ atoms per cubic centimeter. A surface of the body is made p-type by diffusing an acceptor such as zinc into the body to produce a zinc concentration of about $10^{19}$ atoms per cubic centimeter. The depth of the diffusion may be in the range of a few to 100 microns. The p-type portion is then removed except for a strip running in the direction of the progressive variation of composition. Other methods of producing a strip-shaped junction may also be used.

The length of the device and the degree of composition variation per unit length determine the range and sensitivity of the device. In a particular case, a sensitivity of 0.25 volt/mm. has been achieved over a range of from 1.3 to 1.6 volts. In this case, the composition varied from 17% gallium phosphide to 5% gallium phosphide, that is, from $GaAs_{.83}P_{.17}$ to $GaAs_{.95}P_{.05}$.

Since the radiation produced in this material is of long wave length and is nearly infrared radiation, it may be desirable in the case of visual display devices to use a range of composition relatively rich in phosphorous to provide a larger band gap range which produces radiation more easily seen by the human eye.

In the case of zinc seleno-telluride the band gap does not vary linearly with composition but rather exhibits a minimum at $ZnSe_{.36}Te_{.64}$. Accordingly bar-shaped devices can be produced by using a device in which the entire compositional variation lies on one side or the other of this minimum. Alternatively, this minimum can be used to produce a device which turns "on" first in the middle and then spreads outwardly either in one dimension or radially. By using this material, device production is simplified since, during crystal growth, the direction of change of the amount of each element is always the same and the added complexity of reversing the direction of change of the constituents is avoided.

Another alternative material, previously mentioned, is zinc-cadmium telluride. This material emits radiation ranging from the infrared into the long wave length end of the visible spectrum. This may be desirable where the information is supplied directly to a recording or utilizing medium rather than to a human observer.

Material having a low band gap tends to be of higher conductivity than high band gap material. The effect of this higher conductivity is to produce a current path of lower resistance than other parallel current paths through the device, thereby diminishing the brightness of the high band gap and causing excessive currents to pass through the lower band gap region. To minimize this effect, the arrangement shown in FIGURE 2 may be used. As shown therein, means providing current paths of substantially equal resistance through the device are provided comprising a plurality of resistors 8, connected at one end to successive points along the surface of p-type region 3 and ganged at their opposite ends for connection to electrode 6. The series of resistors 8 vary suitably in value so that each of the current paths through each resistor and the adjacent semiconductor material are approximately equal in total resistance. Thus, the current divides equally among the several paths and maintains equal brightness along the lighted portion of the device.

It has also been found that the resistance of the higher resistivity region of body 2, for example region 3 in FIGURE 1, can be used to compensate for the unbalanced resistance arising from the varied band gap. Thus, by positioning the electrode 6 in FIGURE 1 at a point closer to the high band gap end of the device than to the lower band gap end, the current path through the low band gap material includes a relatively long portion of the p-type material. This path can therefore be made approximately equal in total resistance to that of the currrent path through the high band gap material which includes a relatively short portion of the p-type material by properly adjusting the position of electrode 6 so that the sum of the resistance of the junction at any point and the resistance of the region 3 to that point from electrode 6 is substantially equal to the same sum at any other point. Thus, the emitted radiation is of essentially uniform intensity.

It is also noted that, as shown in FIGURE 3, an electrode 16 may be centrally located and the width of the strip junction 15 may be varied by tapering a body 12 having regions 13 and 14 as shown or by simply varying the width of one region 13 to provide a higher resistance path to the low band gap junction region and a low resistance path to the high band gap junction region. Alternatively, if non-uniform light emission is desired, it may be obtained by appropriately placing the electrode or varying the width of the junction non-uniformly, or both.

FIGURE 4 illustrates an embodiment of the present invention wherein the energy band gap of a planar junction increases with radial distance in the plane of the junction from a point of minimum value. The device comprises a support plate 21 upon which is mounted a circular body 22. The body 22 includes a p-type region 23, an n-type region 24 and a junction 25 therebetween. The support plate 21 provides for electrical contact to region 24 and an electrode 26 provides for electrical contact to region 23. Both of these contacts are non-rectifying. A voltage source 27, connected between the support plate 21 and electrode 26, is arranged in a circuit, not shown, so that its magnitude corresponds to the magnitude of a quantity to be displayed by the device.

In this embodiment, the junction 25 is prepared so that the energy band gap thereof is lowest at the center of the device and increases radially in all directions within the plane of the junction. Thus, when the applied voltage approaches the value of the energy band gap at the center, a spot of light appears in the center of the device, and, as the voltage increases, the spot expands as a circle of constantly increasing radius.

As in the bar-shaped embodiment of my invention, the circular embodiment shown in FIGURE 4 may have current paths of higher resistance through the higher band gap regions. Accordingly, the electrode 26 may be connected to a conductive ring 28 which is mounted concentrically on a surface of the circular body 22 and is located so that, as described above, the sum of the resistance of the junction at any selected point within the body and the resistance of the region 23 between ring 28 and the selected point is constantly equal to the corresponding sum at any other point within the junction. Thus, the ring 28 is placed closer to the outer edge of the body 22 so that the current path through region 23 is shorter to the high resistance, high band gap junction portions and longer to the low resistance, low band gap junction portions. Non-uniform light intensities may also be obtained by varying the position of ring 28. In general, the ring 28 is made transparent so as not to interfere with observation of the light pattern.

In accord with another embodiment of my invention, devices may be constructed so that the band gap variation is discontinuous and the output pattern may increase as a series of discrete steps. As shown in FIGURE 5, such a device may include elements corresponding to those of FIGURE 1 except that the body 2 is replaced by body 32 including p-type region 33, n-type region 34 and junction 35. The body 32 comprises a series of segments 36–40. In each of the segments, the composition is constant and therefore the energy band gap within each segment is also constant. The segments are related so that the band gap thereof increases from one end of body 32 to the other and accordingly, as an applied voltage increases, the segments become emissive in step-wise fashion. Such a device could be used as a "safe-caution-danger" indicator or could simply be used in a meter to allow easier visual recognition among various levels. Alternatively, the segment 38 could be the region of minimum value and the emitted radiation could expand to each side thereof with increasing voltage.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A semiconductive device for emitting a pattern of radiation corresponding to the magnitude of an applied potential difference comprising a monocrystalline body of semiconductive material, said body including a first region of p-type conductivity and a second region of n-type conductivity: a p-n junction in said body between said first and second regions, said junction having an energy band gap therein, said junction being adapted to emit radiation upon the application of a potential difference at least as large as said energy band gap across said junction; said junction having a minor dimension equal to the thickness of said junction from said p region to said n region, and a major dimension equal to the length of said junction measured in a surface parallel to said junction; said energy band gap having different values at different locations along said major dimension within said junction; and means for connecting said first and second regions to a source of potential difference to enable production of a pattern of emitted radiation upon the application of a potential difference across said junction.

2. A semiconductive device for emitting a pattern of radiation corresponding to the magnitude of an applied potential difference comprising a monocrystalline body of semiconductive material, said body including a first region of p-type conductivity and a second region of n-type conductivity; a p-n junction in said body between said first and second regions, said junction having an energy band gap therein, said junction being adapted to emit radiation upon the application of a potential difference at least as large as said energy band gap across said junction; said junction having a minor dimension equal to the thickness of said junction from said p region to said n region, and a major dimension equal to the length of said junction measured in a surface parallel to said junction; said energy band gap in said junction having a minimum value at a predetermined region and increasing in value with distance in said junction from said region along said major dimension; and means for connecting said first and second regions to a source of potential difference to enable production of a pattern of emitted radiation which expands from said region of minimum value in response to an increasing potential difference applied across said junction.

3. A semiconductive device as claimed in claim 2 wherein said emitted radiation lies within the visible spectrum; said p-n junction is substantially planar; said junction has a second major dimension equal to the width of said junction measured in said surface parallel to said junction; and said region at which said energy band gap is minimum is centrally located within said junction and the value of said energy band gap increases with distance along said at least one of major dimension in the plane of said junction from said region of minimum value.

4. A semiconductive device for emitting a pattern of radiation corresponding to the magnitude of an applied potential difference comprising a monocrystalline body of semiconductive material, said material comprising a solid solution of semiconductors, said body including a first region of p-type conductivity and a second region of n-type conductivity; a p-n junction in said body between said first and second regions, said junction having an energy band gap therein determined by the relative proportions of said semiconductors, said junction being adapted to emit radiation upon the application of a potential difference greater than said energy band gap across said junction; said junction having a minor dimension equal to the thickness of said junction from said p region to said n region, and a major dimension equal to the length of said junction measured in a surface parallel to said junction; the relative proportions of said semiconductors in said junction having different values at different locations along said major dimension within said junction so as to produce a predetermined pattern of varying energy band gap values within said junction; and means for connecting said first and second regions of said body to a source of potential difference to enable production of a pattern of emitted radiation corresponding to said pattern of energy band gap values upon the application of a potential difference across said junction.

5. A semiconductive device as claimed in claim 4 wherein said proportions of said semiconductors in said semiconductive material vary progressively with distance from the point of minimum concentration of one of said semiconductors to produce a pattern of radiation which changes continuously with a continuous increase in an applied potential difference.

6. A semiconductive device as claimed in claim 4 wherein the relative proportions of said semiconductors vary in discrete steps along said major dimension from a point of minimum concentration of one of said semiconductors to produce a pattern of emitted radiation which changes in discrete steps in response to an increasing applied potential difference.

7. A semiconductive device for emitting a pattern of radiation corresponding to the magnitude of an applied potential difference comprising a monocrystalline body of semiconductive material, said body including a first region of p-type conductivity and a second region of n-type conductivity: a p-n junction in said body between said first and second regions, said junction having an energy band gap therein, said junction being adapted to emit radiation upon the application of a potential difference at least as large as said energy band gap across said junction; said junction having a minor dimension equal to the thickness of said junction from said p region to said n region, and a major dimension equal to the length of said junction measured in a surface parallel to said junction; said energy band gap having different values at different locations along said major dimension within said junction; and means providing current paths of predetermined resistance through the low and high band gap regions of said junction for connecting said first and second regions of said body to a source of potential difference to enable production of a pattern of emitted radiation upon the application of a potential difference across said junction.

8. A semiconductive device as claimed in claim 7 wherein said means providing predetermined resistance current paths comprises a plurality of resistors of predetermined value connected in parallel between a common junction and one of said first and second regions, the values of said resistors being inversely proportional to the respective resistances of the junction adjacent the points of connection of said resistors to said one region.

9. A semiconductive device as claimed in claim 7 wherein said means providing predetermined resistance current paths comprises an electrode connected to one of said first and second regions, the point of connection of said electrode to said region being selected so that the sum of the resistance of the junction at any selected point within said body and the resistance of said one region between said selected point and said electrode connection point is substantially equal to the corresponding sum at any other point within said junction.

10. A semiconductive device as claimed in claim 7 wherein said means providing predetermined resistance current paths comprises an electrode connected to one of said first and second regions, the width of said one region being varied so that the sum of the resistance of said junction at any selected point within said body and the resistance of said one region between said selected point and said electrode is substantially equal to the corresponding sum at any other point within said junction.

11. A semiconductive device for emitting a pattern of radiation corresponding to the magnitude of an applied potential difference comprising a monocrystalline body of semiconductive material, said material comprising a solid solution of gallium arseno-phosphide of the form $GaAs_xP_{1-x}$ wherein $x$ may vary between zero and one, said body including a first region of p-type conductivity and a second region of n-type conductivity; a p-n junction in said body between said first and second regions, said junction having an energy band gap therein determined by the relative proportions of arsenic and phosphorous therein, said junction being adapted to emit radiation upon the application of a potential difference greater than said energy band gap across said junction; said junction having a minor dimension equal to the thickness of said junction from said p region to said n region, and a major dimension equal to the length of said junction measured in a surface parallel to said junction; said relative proportions of arsenic and phosphorous in said solid solution having different values at different locations along said major dimension within said junction so as to produce a predetermined pattern of varying energy band gap values within said junction; and means for connecting said first and second regions of said body to a source of potential difference to enable production of a pattern of emitted radiation corresponding to said pattern of energy band gap values upon the application of a potential difference across said junction.

12. A semiconductive device for emitting a pattern of radiation corresponding to the magnitude of an applied potential difference comprising a monocrystalline body of semiconductive material, said material comprising a solid solution of zinc seleno-telluride of the form $ZnSe_xTe_{1-x}$ wherein $x$ may vary between zero and one, said body including a first region of p-type conductivity and a second region of n-type conductivity; a p-n junction in said body between said first and second regions, said junction having an energy band gap therein determined by the relative proportions of selenium and tellurium therein, said junction being adapted to emit radiation upon the application of a potential difference greater than said energy band gap across said junction; said junction having a minor dimension equal to the thickness of said junction from said p region to said n region, and a major dimension equal to the length of said junction measured in a surface parallel to said junction; said relative proportions of selenium and tellurium in said solid soultion having different values at different locations along said major dimension within said junction so as to produce a predetermined pattern of varying energy band gap values within said junction; and means for connecting said first and second regions of said body to a source of potential difference to enable production of a pattern of emitted radiation corresponding to said pattern of energy band gap values upon the application of a potential difference across said junction.

13. A semiconductive device for emitting a pattern of radiation corresponding to the magnitude of an applied potential difference comprising a monocrystalline body of semiconductive material, said material comprising a solid solution of zinc-cadmium telluride of the form $Zn_xCd_{1-x}Te$ wherein $x$ may vary between zero and one, said body including a first region of p-type conductivity and a second region of n-type conductivity; a p-n- junction in said body between said first and second regions, said junction having an energy band gap therein determined by the relative proportions of zinc and cadmium therein, said junction being adapted to emit radiation upon the application of a potential difference greater than said energy band gap across said junction; said junction having a minor dimension equal to the thickness of said junction from said p region to said n region, and a major dimension equal to the length of said junction measured in a surface parallel to said junction; said relative proportions of zinc and cadmium in said solid solution having different values at different locations along said major dimension within said junction so as to produce a predetermined pattern of varying energy band gap values within said junction; and means for connecting said first and second regions of said body to a source of potential difference to enable production of a pattern of emitted radiation corresponding to said pattern of energy band gap values upon the application of a potential difference across said junction.

References Cited

UNITED STATES PATENTS

| | | | |
|---|---|---|---|
| 3,111,611 | 11/1963 | Hunter | 317—235 |
| 3,132,057 | 5/1964 | Greenberg | 317—235 |
| 3,249,473 | 5/1966 | Holonyak | 317—235 |
| 3,261,726 | 7/1966 | Ruehrwein | 317—237 |

JAMES W. LAWRENCE, *Primary Examiner.*

R. JUDD, *Assistant Examiner.*